Aug. 9, 1932.    F. C. FRANK    1,871,314
BRAKE
Filed June 30, 1930

INVENTOR.
FREDERICK C. FRANK
BY M. W. McConkey
ATTORNEY

Patented Aug. 9, 1932

1,871,314

UNITED STATES PATENT OFFICE

FREDERICK C. FRANK, OF SOUTH BEND, INDIANA, ASSIGNOR TO BENDIX BRAKE COMPANY, OF SOUTH BEND, INDIANA, A CORPORATION OF ILLINOIS

BRAKE

Application filed June 30, 1930. Serial No. 464,748.

This invention relates to brakes.

An important object of the invention is to provide a reinforcing member for the anchor and operating shaft of a brake.

Another important object of the invention is to provide a single reinforcing member for the anchor and operating shaft which will not only stiffen these members, but will, in addition thereto, prevent injury to the backing plate.

Another object of the invention is to provide an operating member for a brake shoe including spaced actuating and guiding members.

A further object of the invention is to provide a brake shoe having a reinforced shoulder, supporting thrust rollers and a double lobe cam adapted to embrace the reinforcing members and to engage the thrust rollers, so that the shoe may be effectively operated and at the same time guided by the cam.

Other parts of the invention will appear from the following description taken in connection with the drawing, which form a part of this specification, and in which.

Figure 1:
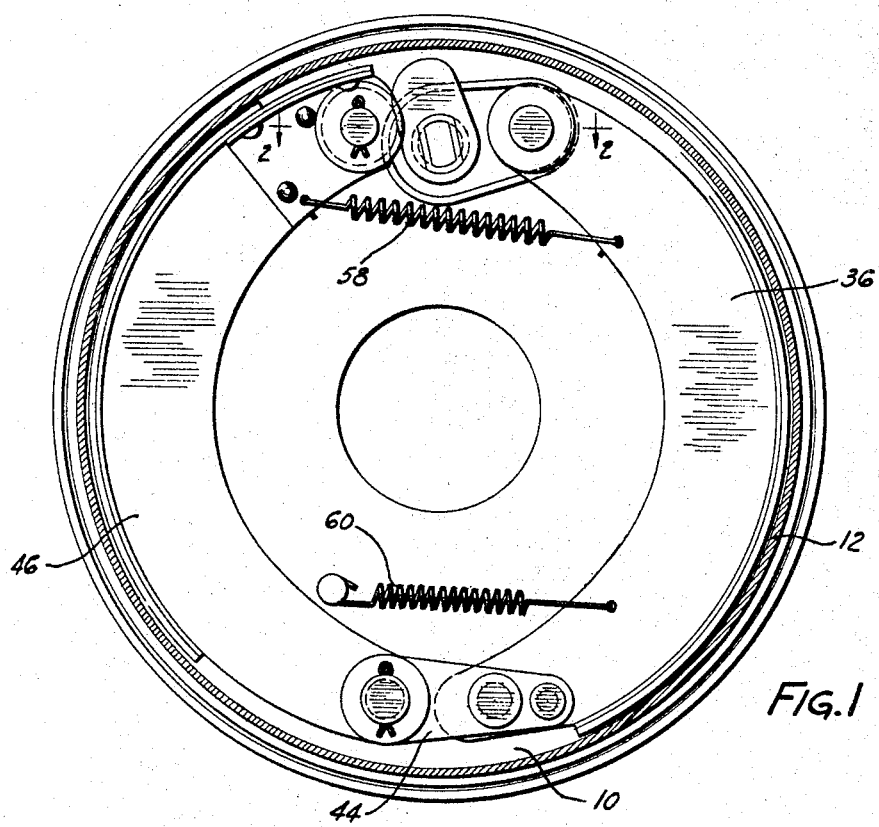
Figure 1 is a vertical sectional view of a brake taken just back of the head of the drum showing the friction elements in elevation and illustrating the invention as applied.
Figure 2:
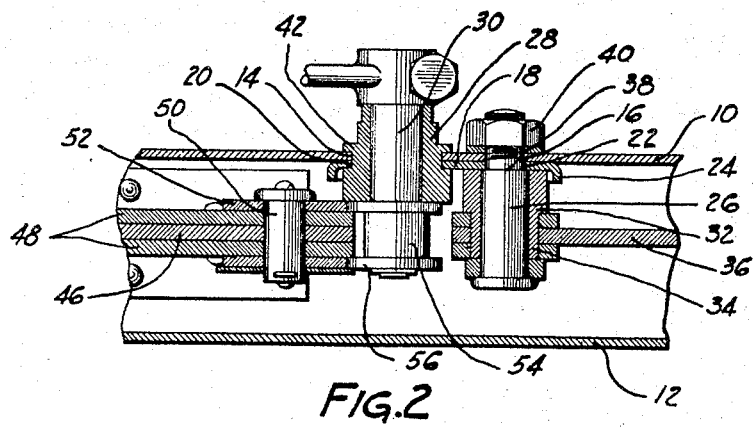
Figure 2 is a sectional view substantially on line 2—2, Figure 1.
Figure 3:
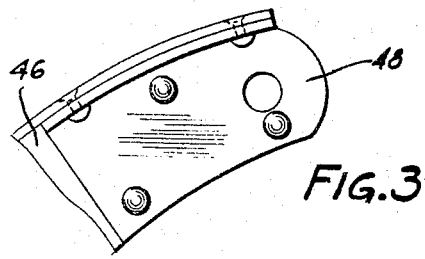
Figure 3 is a detailed view illustrating a reinforced shoulder of a friction element.

Referring to the drawing for more specific details of the invention, 10 represents a fixed support such as a backing plate having associated therewith a rotatable drum 12. This drum may be secured to a wheel or any other rotatable member in any desirable manner.

Positioned in the backing plate are adjacent openings 14 and 16 and clamped against the inner surface of the backing plate is a reinforcing plate or stamping 18 provided with openings 20 and 22 registering with the openings 14 and 16 respectively. This stamping has a perimetral flange 24 which lends strength and rigidity to the structure. It provides an ideal reinforcement for an anchor pin 26 and a bracket 28 in which is positioned for rotation an operating shaft 30.

As shown, the anchor pin 26 has positioned thereon a sleeve 32 provided with a reduced end portion 34 on which is pivotally mounted one end of a brake shoe 36 beneath the head of the pin. The pin has a shoulder 38 which engages the face of the stamping 18 and serves as an abutment for clamping the stamping 18 and the backing plate together between the shoulder and a nut 40 on the outer end of the pin.

The stamping 18 is further secured in position by the bracket 28 supporting the operating shaft 30. This bracket comprises a shouldered sleeve which is slipped through the opening 14 in the backing plate and the opening 20 in the stamping 18 and is provided with an upset flange 42 which serves to rivet the stamping 18 and the backing plate together.

The shoe 36 has riveted or otherwise secured thereto a relatively short arm 44 which is pivotally connected to a shoe 46. The shoe 46 is provided with reinforcing angle plates 48 riveted or otherwise secured thereto and extending transversely through the shoe and the reinforcing plates is a pin 50 having positioned thereon for rotation corresponding thrust rollers 52. As shown, these thrust rollers are set back from the shouldered end of the shoe, the object of which will hereinafter appear.

The operating shaft 30, positioned for rotation in the bracket 28, carries a cam 54 having oppositely disposed and corresponding lobes 56 embracing the reinforced end of the shoe 46 and engaging the corresponding rollers 52, so that upon operation of the cam 54, the shoe is guided by the respective lobes 56 and since these lobes engage the thrust rollers 52, the shoe may be actuated and guided simultaneously by the cam.

As shown, the shoes 36 and 46 are connected as by a spring 58 and connecting the shoe 36 to the backing plate is a spring 60. These springs serve to return the shoes to an off position and to retain them in proper spaced relation to the drum.

While a preferred embodiment of the invention has been described, it is to be understood that this is given merely as an example of the underlying principles of the invention and since the invention may be incorporated in other specific mechanical structures, I do not intend to be limited to that shown, except as such limitations are clearly imposed by the appended claims.

Having thus described the various features of the invention, what I claim as new and desire to secure by Letters Patent is:

1. A brake comprising a backing plate, a bracket for an operating shaft, an anchor adjacent thereto and a reinforcing member for the bracket and anchor including a cup-shaped plate secured to the backing plate by the bracket and anchor.

2. A brake comprising a backing plate, a bracket for an operating shaft positioned thereon, an anchor positioned on the backing plate adjacent to the bracket, a reinforcing member for the bracket and anchor including a stamping having a perimetral flange and means on the bracket and anchor for securing the stamping to the backing plate.

3. A brake comprising a backing plate, a friction element positioned for movement thereon, reinforcing members secured to the shouldered end of the friction element, thrust rollers positioned on the reinforcing members and spaced from the shouldered end thereof, an operating shaft positioned for rotation on the backing plate, a cam carried by the operating shaft, and corresponding and oppositely disposed integral lobes on the cam embracing the reinforcing members and engaging the thrust rollers.

4. A brake comprising a backing plate, a bracket supported on the backing plate, an anchor on the backing plate adjacent to the bracket, means for reinforcing the bracket and the anchor including a stamping having a perimetral flange, a friction element pivoted on the anchor, a reinforced shoulder on the friction element, corresponding and oppositely disposed thrust rollers on the friction element arranged in spaced relation from the end thereof, an operating shaft positioned for rotation in the bracket, a cam carried by the shaft, and corresponding spaced lobes on the cam embracing the end of the friction element and engaging the thrust rollers positioned thereon.

5. A brake comprising a backing plate, a flanged reinforcing member mounted thereon with its flange outstanding, and an anchor member passing through the backing plate and reinforcing member and securing them together.

6. A brake comprising a backing plate, a reinforcing plate having a peripheral flange mounted on the backing plate with its flange projecting away from the backing plate, and an anchor member passing through holes in the backing plate and reinforcing plate.

7. A brake comprising a backing plate, a reinforcing plate having a peripheral flange mounted on the backing plate with its flange projecting outwardly from the backing plate, and an anchor and a bracket passing through holes in the backing plate and reinforcing plate and holding the reinforcing plate in position relative to the backing plate.

In testimony whereof, I have hereunto signed my name.

FREDERICK C. FRANK.